May 8, 1923.
A. ERICKSON
ANIMAL POKE
Filed Jan. 27, 1923
1,454,317
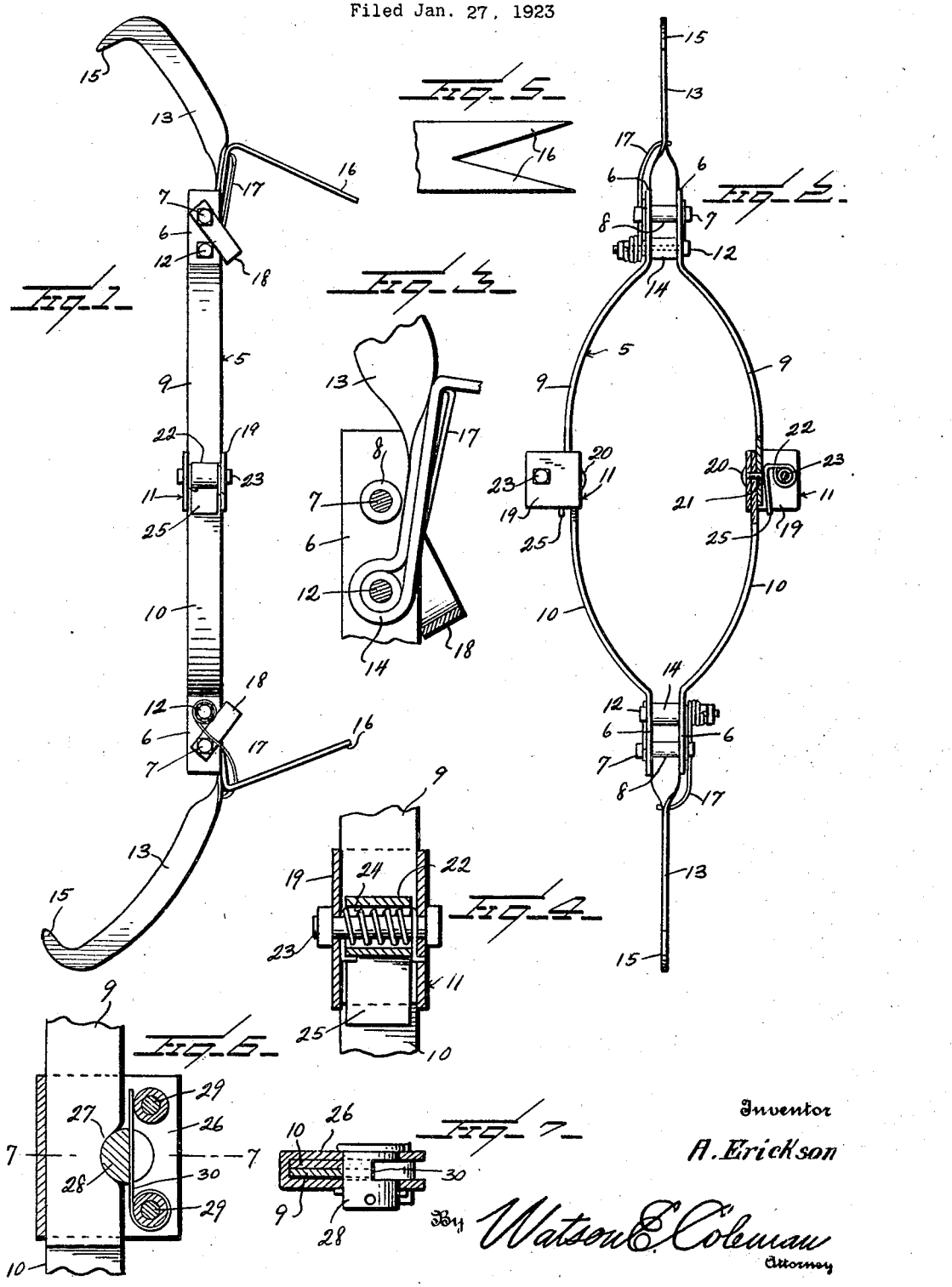
Inventor
A. Erickson
By Watson E. Coleman
Attorney Patented May 8, 1923.

1,454,317

UNITED STATES PATENT OFFICE.

AMOS ERICKSON, OF KEOTA, COLORADO.

ANIMAL POKE.

Application filed January 27, 1923. Serial No. 615,361.

*To all whom it may concern:*

Be it known that I, AMOS ERICKSON, a citizen of the United States, residing at Keota, in the county of Weld and State of Colorado, have invented certain new and useful Improvements in Animal Pokes, of which the following is a specification, reference being had to the accompanying drawings.

This invention relates to certain new and useful improvements in animal pokes, and the primary object of the invention is to generally improve and simplify devices of this character whereby the same may meet with all of the requirements for a successful commercial use.

Another object of the invention is to provide an animal poke with improved fence engaging levers provided with animal engaging spurs adapted to be moved into engagement with the animal upon continued forward movement of the animal after engagement of the levers with the fence, means being provided to yieldingly normally maintain the levers forwardly swung with the spurs out of engagement with the animal.

A further object of the invention is to form and mount the levers in a novel and improved manner and to provide simple and practical means for limiting rearward swinging movement of the levers.

With the above general objects in view, and others that will become apparent as the nature of the invention is better understood, the same consists in the novel form, combination and arrangement of parts hereinafter more fully described, shown in the accompanying drawings and claimed.

In the drawings, wherein like reference characters indicate corresponding parts throughout the several views:—

Figure 1 is a side elevational view of an animal poke constructed in accordance with the present invention;

Figure 2 is a front elevational view thereof, partly in section;

Figure 3 is an enlarged fragmentary view of one end of the yoke and adjacent parts, taken in longitudinal section adjacent the inner face of one of the parallel end portions of the yoke;

Figure 4 is an enlarged fragmentary view partly in longitudinal section, showing the overlapping ends of the sections of one side member of the yoke and details of the latch for retaining these ends connected;

Figure 5 is a fragmentary plan view showing the spurs of the fence engaging levers;

Figure 6 is a view partly in longitudinal section and partly in elevation showing a modified form of latch for the overlapping ends of the yoke sections; and Figure 7 is a transverse sectional view taken substantially upon line 7—7 of Figure 6.

Referring more in detail to the several views, the present invention embodies a yoke generally denoted by the numeral 5 and composed of a pair of side members, preferably formed from strap iron, converging toward their end portions, and having said end portions terminating in parallel spaced relation as at 6. These parallel spaced ends are rigidly connected in the relation shown by means of transverse bolts 7 having spacing sleeves 8 thereon.

The side members of the yoke are formed in complemental sections 9 and 10 which are disposed in overlapping relation at the center of the yoke and suitably detachably connected by fastening means generally denoted by the numeral 11, thus forming the yoke in half sections so that the device may be readily placed upon or removed from the animal's neck.

Extending transversely through the parallel ends of the yoke inwardly of the bolts 7 are further bolts or pins 12 upon which the fence engaging levers 13 are pivoted.

Each lever 13 preferably consists of a length of strap iron return-bent between its ends to provide a tubular journal 14 mounted upon one of the pivot bolts or pins 12, one end portion of the lever extending outwardly behind the adjacent bolt 7 and curving forwardly where its end is twisted at right angles to the body of the strip and terminates in a forwardly directed hook 15 in the usual manner.

The other end portion of the lever extends outwardly and then rearwardly and inwardly with its rear end portion formed with a spur or spurs 16.

Suitably associated with the levers are springs 17 acting to hold the levers in forwardly swung positions wherein they engage the bolts 7 to limit the forward movement of the same. Each bolt 7 has a U-shaped stirrup 18 secured thereto in a fixed position with the base of the stirrup positioned rearwardly of the adjacent pivot pin or bolt 12 and lying in the path of the lever so as to limit its rearward movement to a point where the spur or spurs 16 of said lever have effectively engaged the animal's neck.

The means for detachably connecting the overlapping ends of the sections of the yoke side members preferably embodies a U-shaped clamp frame 19 rigidly secured to the inner end of one of the sections with its base receiving the end of said section thereon, and with the parallel legs of the clamp frame extending outwardly. The end of this yoke section is provided with an outwardly projecting stud 20 disposed to enter a perforation 21 in the overlying end of the other section, and this overlying end is held engaged with the stud by the pivoted cam 22 suitably mounted upon a transverse bolt 23 extending through the legs of the clamp frame. The cam 22 is preferably provided with a spring 24 to normally hold it in retaining position, and said cam is so disposed that a pull for separating the sections will act to increase the holding effect of the cam. This cam is provided with a projecting portion 25 to be engaged by the finger for releasing it at will.

Referring to Figures 6 and 7 wherein a modified form of fastening means is shown for detachably connecting the overlapping ends of the yoke members, 26 denotes a U-shaped clamp frame rigidly fastened with the inner surface of one of its leg portions in contact with the inner face of one of the sections of the yoke at the inner end of said section. This clamp frame is of such width as to snugly accommodate the end of the other yoke section between its other side and the adjacent end of the yoke section which is secured to said clamp frame, and said yoke section has its inner end formed with a notch 27 in one edge thereof. A rotatable member or latch 28 is journaled through the sides of the clamp frame 26 and has its intermediate portion of semi-cylindrical form so that when it is turned in one position the notched end of the yoke section is freely admitted, whereupon said latch member 28 is rotated a half turn so as to enter said notch 27 and thereby effectively retain the ends of the sections connected.

A pair of bolts 29 are secured through the legs of the frame 26 at opposite sides of the latch 28 and outwardly of the latter, and the ends of a resilient friction spring 30 are associated with the bolts 29 between the sides of the frame 26 so that the intermediate portion of said spring engages frictionally with the latch 28 for preventing its accidental rotation.

In operation, the two half sections of the yoke are separated and one of the same disposed above the animal's neck while the other is disposed below the same, and with the hooks of the levers 13 directed forwardly. The yoke sections are then connected to secure the device upon the animal's neck and should the animal attempt to force his way through a fence, the latter will be engaged by the levers 13 so that the latter will be tilted rearwardly for engaging the spurs 16 with the animal. This action of the spurs 16 will generally induce the animal to cease his efforts.

From the foregoing description it is believed that the construction and operation as well as the advantages of the present invention will be readily understood and appreciated by those skilled in the art.

Minor changes may be made without departing from the spirit and scope of the invention as claimed.

What I claim is:—

1. An animal poke including a yoke formed of side members converging toward their ends and having their end portions terminating in parallel spaced relation, levers pivoted between the sides of the yoke near the inner portions of said parallel ends, and bolts having spacing sleeves thereon and passing through the outer portions of said parallel ends for rigidly connecting the sides of the yoke in spaced relation, said levers extending outwardly and forwardly with their inner ends disposed behind said bolts whereby the latter forms stops for limiting forward swinging movement of the levers, and means to yieldingly swing the levers forwardly into engagement with said bolts.

2. An animal poke including a yoke formed of side members converging toward their ends and having their end portions terminating in parallel spaced relation, levers pivoted between the sides of the yoke near the inner portions of said parallel ends, and bolts having spacing sleeves thereon and passing through the outer portions of said parallel ends for rigidly connecting the sides of the yoke in spaced relation, said levers extending outwardly and forwardly with their inner ends disposed behind said bolts whereby the latter forms stops for limiting forward swinging movement of the levers, means to yieldingly swing the levers forwardly into engagement with said bolts, and U-shaped stirrups rigidly supported by said bolts with their bases disposed rearwardly of the pivots of the levers in the path of rearward movement of the latter, whereby said stirrups limit the rearward swinging movement of said levers.

3. An animal poke including a yoke formed of side members converging toward their ends and having their end portions terminating in parallel spaced relation, levers pivoted between the sides of the yoke near the inner portions of said parallel ends, and bolts having spacing sleeves thereon and passing through the outer portions of said parallel ends for rigidly connecting the sides of the yoke in spaced relation, said levers extending outwardly and forwardly with their inner ends disposed behind said bolts whereby the latter forms stops for limiting forward swinging movement of the levers, means to yieldingly swing the levers forwardly into engagement with said bolts, U-shaped stirrups rigidly supported by said bolts with their bases disposed rearwardly of the pivots of the levers in the path of rearward movement of the latter, whereby said stirrups limit the rearward swinging movement of said levers, and rearwardly and inwardly projecting members on the levers having spurs at their inner ends arranged to engage the animal upon rearward swinging movement of the levers.

4. In an animal poke, a yoke having its ends terminating in parallel spaced relation, a lever pivoted between said ends, means yieldingly normally holding said lever forwardly swung, and means rigidly connecting the ends of the yoke members in spaced relation and forming a stop for limiting the forward swinging movement of the lever, said lever including a member projecting rearwardly and inwardly therefrom and having a spur upon its inner free end normally disposed out of engagement with the animal and adapted to engage the animal upon rearward swinging movement of the lever.

5. In an animal poke, a yoke having its ends terminating in parallel spaced relation, a lever pivoted between said ends, means yieldingly normally holding said lever forwardly swung, means rigidly connecting the ends of the yoke members in spaced relation and forming a stop for limiting the forward swinging movement of the lever, said lever including a member projecting rearwardly and inwardly therefrom and having a spur upon its inner free end normally disposed out of engagement with the animal and adapted to engage the animal upon rearward swinging movement of the lever, and means fixed to the means for rigidly connecting the yoke members, for limiting the rearward swinging movement of the levers to a position wherein the spurs have effectively engaged the animal.

6. In an animal poke, a yoke having its ends terminating in parallel spaced relation, a lever pivoted between said ends, means yieldingly normally holding said lever forwardly swung, means rigidly connecting the ends of the yoke members in spaced relation and forming a stop for limiting the forward swinging movement of the lever, said lever including a member projecting rearwardly and inwardly therefrom and having spurs upon its inner free end normally disposed out of engagement with the animal and adapted to engage the animal upon rearward swinging movement of the lever, and means fixed to the means for rigidly connecting the yoke members, for limiting the rearward swinging movement of the lever to a position wherein the spurs have effectively engaged the animal, said last named means comprising a U-shaped stirrup with its base arranged in the path of the lever rearwardly of the pivot of the lever.

In testimony whereof I hereunto affix my signature.

AMOS ERICKSON.